United States Patent
Jeong et al.

(10) Patent No.: US 10,267,409 B2
(45) Date of Patent: Apr. 23, 2019

(54) SHIFT LEVER HOUSING FOR MANUAL TRANSMISSION

(71) Applicants: Hyundai Motor Company, Seoul (KR); Kia Motors Corporation, Seoul (KR)

(72) Inventors: Gwang Hee Jeong, Whasung-Si (KR); Seong Uk Bae, Whasung-Si (KR); Ja Yong Koo, Whasung-Si (KR); Eun Sik Kim, Whasung-Si (KR); Yong Ik Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 15/634,840

(22) Filed: Jun. 27, 2017

(65) Prior Publication Data
US 2018/0112769 A1    Apr. 26, 2018

(30) Foreign Application Priority Data
Oct. 21, 2016 (KR) .................. 10-2016-0137354

(51) Int. Cl.
| | |
|---|---|
| *B60K 20/00* | (2006.01) |
| *F16C 1/00* | (2006.01) |
| *G05G 9/00* | (2006.01) |
| *F16H 59/04* | (2006.01) |
| *F16H 61/36* | (2006.01) |
| *F16H 59/02* | (2006.01) |

(52) U.S. Cl.
CPC ............. *F16H 59/04* (2013.01); *F16H 61/36* (2013.01); *F16H 2059/026* (2013.01)

(58) Field of Classification Search
CPC .......................... F16H 2059/026; F16H 59/04
See application file for complete search history.

(56) References Cited

U.S. PATENT DOCUMENTS

| 4,515,032 | A * | 5/1985 | Olmsted ................ B60K 20/04 267/150 |
|---|---|---|---|
| 5,277,077 | A * | 1/1994 | Osborn ................... F16H 59/10 29/401.1 |
| 6,038,939 | A * | 3/2000 | Wheeler ................ B60K 20/04 74/473.1 |
| 6,176,809 | B1 * | 1/2001 | Visser ............... B60R 25/02144 477/96 |
| 6,196,079 | B1 * | 3/2001 | Paparoni ................ F16H 59/04 74/471 XY |
| 2012/0132027 | A1 * | 5/2012 | Bruder .................. B60K 20/04 74/473.15 |

(Continued)

FOREIGN PATENT DOCUMENTS

KR         10-1620265 B1      5/2016

*Primary Examiner* — Jake Cook
(74) *Attorney, Agent, or Firm* — Morgan, Lewis & Bockius LLP (57) ABSTRACT

A shift lever housing for a manual transmission may include a shift cable base portion sealed to not have a hole that is open downward to a bottom located between a shift cable through-hole and a shift cable connector; and a select cable base portion positioned at one side of the shift cable base portion and having a base hole that is open downward to a bottom located between a selector lever installation hole and a select cable connector.

13 Claims, 4 Drawing Sheets

(56) References Cited

U.S. PATENT DOCUMENTS

2012/0291581 A1* 11/2012 Ujimoto .................. F16H 59/04
　　　　　　　　　　　　　　　　　　　　74/473.33
2013/0220051 A1* 8/2013 Geberth .................. F16H 59/04
　　　　　　　　　　　　　　　　　　　　74/473.3

* cited by examiner

SHIFT LEVER HOUSING FOR MANUAL TRANSMISSION

CROSS REFERENCE TO RELATED APPLICATION

The present application claims priority of Korean Patent Application No. 10-2016-0137354 filed on Oct. 21, 2016, the entire contents of which is incorporated herein for all purposes by this reference.

BACKGROUND OF THE INVENTION

Field of the Invention

The present invention relates to a shift lever housing for a manual transmission, and, more particularly, to a shift lever housing for a manual transmission, which is capable of achieving a reduction in weight and cost by forming holes in portions that do not affect strength at the time of shift and select operation, and of reinforcing weak strength by forming ribs in portions that are weakened by the formation of the holes.

Description of Related Art

A shift lever housing is fixedly installed to the side of a driver seat in a vehicle equipped with a manual transmission, a shift lever and a selector lever are rotatably coupled to the shift lever housing, and a shift cable and a select cable are respectively connected to the shift lever and the selector lever.

The shift lever has a spherical hinge provided in the middle thereof, and the spherical hinge is coupled to the shift lever housing so as to be rotatable in all directions. On the basis of the spherical hinge, a knob is coupled to the upper end of the shift lever, and one end of the shift cable is connected to the lower end of the shift lever.

The selector lever is connected to the spherical hinge of the shift lever through a connecting rod, and the selector lever rotates in the forward and backward directions to the shift lever housing when the shift lever operates in a select direction.

Meanwhile, the shift lever housing is a component to which a large load occurring when a driver shifts gears is transmitted through the shift lever. Accordingly, since the shift lever housing needs to sufficiently endure a large load occurring at the time of gear shifting, it has a large volume.

However, the conventional large-volume shift lever housing has a structure in which a portion that does not affect strength at the time of the operation of the shift lever for gear shifting is also sealed. Accordingly, the conventional shift lever housing is advantageous in terms of securing strength whereas it is disadvantageous in terms of reducing fuel efficiency due to heavy weight. In addition, the conventional shift lever housing may cause an increase in cost.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift lever housing for a manual transmission, which is configured for achieving a reduction in weight and cost by forming holes in portions that do not affect strength at the time of shift and select operation, and of reinforcing weak strength by forming ribs in portions that are weakened by the formation of the holes.

In accordance with an aspect of the present invention, a shift lever housing for a manual transmission includes a shift cable base portion sealed so as not to have a hole that is open downward to a bottom located between a shift cable through-hole and a shift cable connector, and a select cable base portion positioned at one side of the shift cable base portion and having a base hole that is open downward to a bottom located between a selector lever installation hole and a select cable connector.

An intermediate partition wall may protrude upward to partition the shift cable base portion and the select cable base portion, and a plurality of first vertical ribs for connecting the shift cable base portion to the intermediate partition wall may be formed to be distanced from each other in forward and backward directions.

A shift cable base portion side wall facing the intermediate partition wall may protrude upward, and a plurality of second vertical ribs for connecting the shift cable base portion to the shift cable base portion side wall may be formed to be distanced from each other in the forward and backward directions.

The shift cable connector may connect the intermediate partition wall to the shift cable base portion side wall and protrude upward, and a plurality of third vertical ribs for connecting the shift cable base portion to the shift cable connector may be formed to be distanced from each other in left and right directions.

A plurality of horizontal partition walls for connecting the intermediate partition wall to the shift cable base portion side wall may be formed between the shift cable through-hole and the shift cable connector and protrude upward, and a plurality of fourth vertical ribs for connecting the shift cable base portion to the horizontal partition walls may be formed to be distanced from each other in the left and right directions.

A select cable base portion side wall facing the intermediate partition wall may protrude upward, the select cable connector may connect the intermediate partition wall to the select cable base portion side wall and protrude upward, and a plurality of fifth vertical ribs for connecting the select cable base portion to the select cable connector may be formed to be distanced from each other in the left and right directions.

The base hole may be formed with cross reinforcement ribs disposed in a checkerboard shape, and front and rear end portions of the cross reinforcement ribs may be connected to the select cable base portion and left and right end portions of the cross reinforcement ribs may be connected to the intermediate partition wall and the select cable base portion side wall.

A front right mounting hole may be formed between the selector lever installation hole and the base hole, a front left mounting hole may be formed in one side of the shift cable base portion side wall, and a plurality of front left edge holes may be formed in a side portion in front of the front left mounting hole while being open downward between the front left mounting hole and the shift cable base portion side wall.

An intermediate base portion may be positioned in the rear of the shift cable through-hole and protrude upward, the shift cable through-hole and the selector lever installation hole may be formed in a front side and one side of the intermediate base portion, the intermediate base portion may have a circular hinge mounting port that is formed in an upper side thereof and protrudes upward, a spherical hinge of a shift lever being rotatably mounted to the hinge mounting port, and a plurality of sixth vertical ribs for connecting the intermediate base portion to the hinge mounting port may be formed to be distanced from each other in a circumferential direction of the hinge mounting port.

The intermediate base portion may have a rear through-hole and an intermediate through-hole that are respectively formed in a rear side and the other side thereof, a rear right mounting hole and a rear left mounting hole may be formed in respective right and left portions behind the rear through-hole, and a plurality of intermediate left edge holes may be formed in a side portion of the intermediate through-hole while being open downward between the front left mounting hole and the rear left mounting hole.

A plurality of rear edge holes may be formed in an edge portion behind the rear through-hole while being open downward between the rear right mounting hole and the rear left mounting hole.

An intermediate portion between the rear right mounting hole and the rear left mounting hole may be formed in a rear end portion, in which rear edge holes are formed, to protrude forward toward the rear through-hole.

The intermediate portion of the rear end portion may protrude forward to a maximum point between a center line, which connects a center of the rear right mounting hole and a center of the rear left mounting hole, and an external common tangent of the rear right mounting hole and the rear left mounting hole, the external common tangent being positioned in front of the center line.

A sealed portion with no downward open hole may be formed in a side portion of the selector lever installation hole between the front right mounting hole and the rear right mounting hole, and a plurality of rear right edge holes may be formed in a side portion between the sealed portion and the rear right mounting hole while being open downward.

As apparent from the above description, since no downward open hole is formed in a portion that affects the strength maintenance of the shift lever housing when shifting gears using the shift lever in the exemplary embodiment of the present invention, it is possible to sufficiently maintain a desired strength. On the other hand, since a plurality of downward open holes are formed in portions that do not affect the strength maintenance of the shift lever housing when shifting gears using the shift lever, it is possible to reduce the overall weight and cost of the shift lever housing and thus to improve fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

A shift lever housing for a manual transmission according to the exemplary embodiments of the present invention will be described below with reference to the accompanying drawings.

Figure 1:
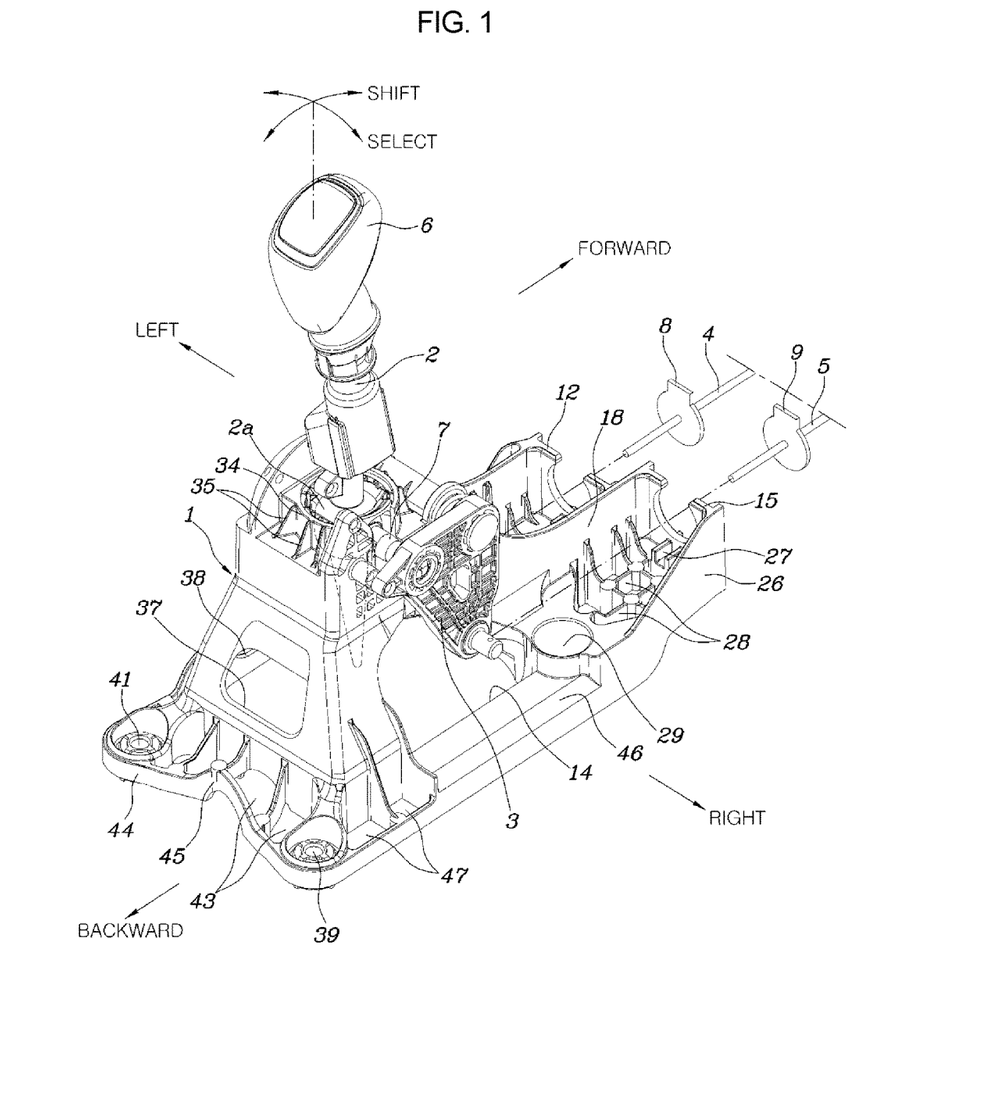
FIG. 1 is a perspective view for explaining a shift lever housing according to an exemplary embodiment of the present invention.
Figure 2:
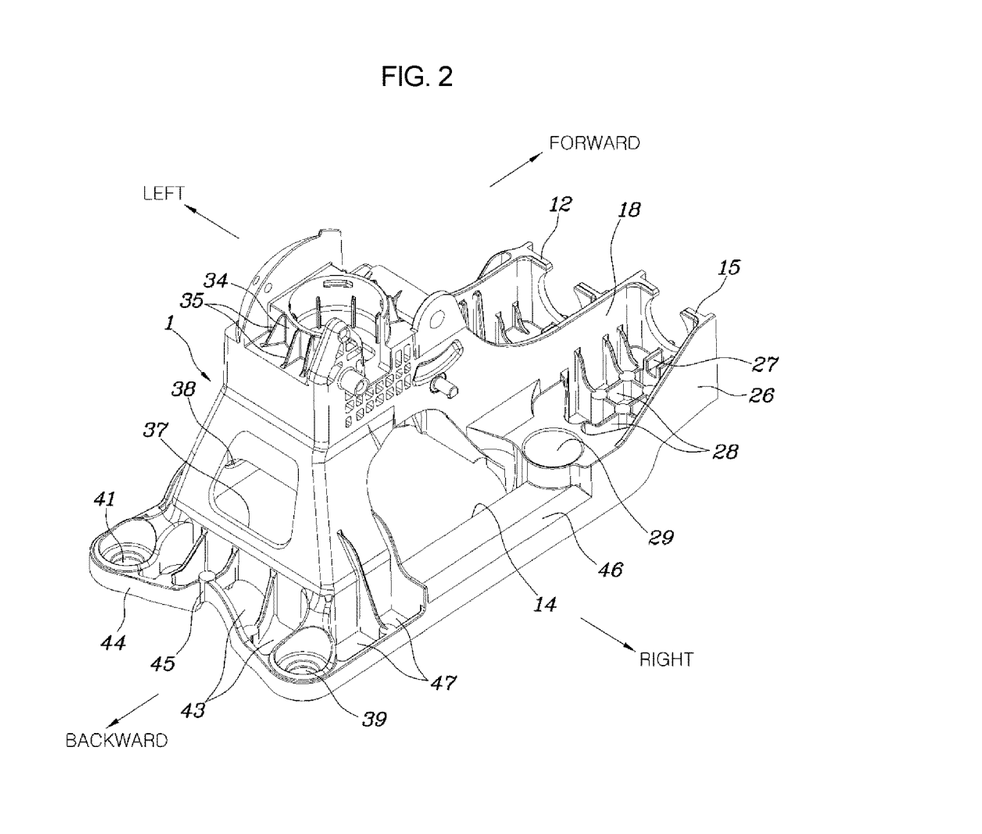
FIG. 2 and FIG. 3 are perspective views illustrating a state in which a shift lever and a selector lever are removed from FIG. 1.
Figure 3:
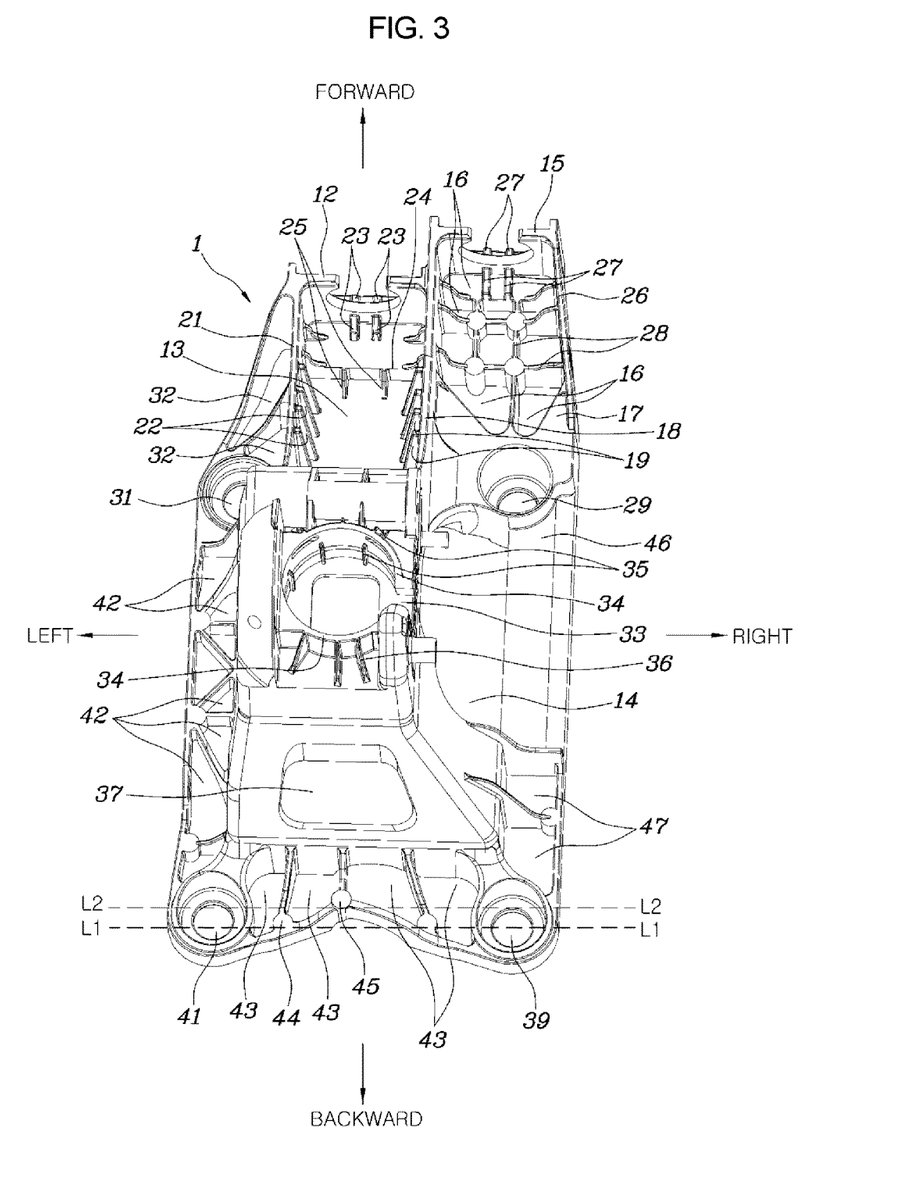

As illustrated in FIG. 1, a shift lever housing 1 is fixed to the side of a driver seat in a vehicle equipped with a manual transmission, a shift lever 2 and a selector lever 3 are rotatably coupled to the shift lever housing 1, and a shift cable 4 and a select cable 5 are respectively connected to the shift lever 2 and the selector lever 3.

The shift lever 2 has a spherical hinge 2a provided at the longitudinal middle thereof, and the spherical hinge 2a of the shift lever 2 is coupled to the shift lever housing 1 to be rotatable in all directions.

A knob 6 is coupled to the upper end portion of the shift lever 2 about the spherical hinge 2a, and the lower end portion of the shift lever 2 about the spherical hinge 2a is inserted into the shift lever housing 1 so that one end portion of the shift cable 4 is connected thereto.

A connecting rod 7 protrudes from one side of the spherical hinge 2a, and the front end portion of the connecting rod 7 is coupled to the selector lever 3. Thus, the selector lever 3 rotates in the forward and backward directions to the shift lever housing 1 when the shift lever 2 operates in a select direction.

The shift lever housing 1 is a component to which a large load occurring when a driver shifts gears is transmitted through the shift lever 2. Accordingly, since the shift lever housing 1 needs to sufficiently endure a large load occurring at the time of gear shifting, it has a large volume. The large-volume shift lever housing is advantageous in terms of securing strength whereas it is disadvantageous in terms of fuel efficiency due to heavy weight and may cause an increase in cost.

Therefore, the shift lever housing 1 according to the exemplary embodiment of the present invention is characterized in that a plurality of holes are formed in portions that do not affect strength at the time of the operation of the shift lever 2 for gear shifting to achieve a reduction in weight and cost, and ribs are formed in portions that are weakened by the formation of the holes to reinforce weak strength and maintain strong strength.

That is, as illustrated in FIGS. 1 to 4, the shift lever housing 1 according to the exemplary embodiment of the present invention includes a shift cable base portion 13 sealed so as not to have a hole that is open downward to the bottom located between a shift cable through-hole 11 and a shift cable connector 12, and a select cable base portion 17 positioned at one side of the shift cable base portion 13 and having a base hole 16 that is open downward to the bottom located between a selector lever installation hole 14 and a select cable connector 15.

The shift cable through-hole 11 is a through-hole through which one end portion of the shift cable 4 is coupled to the lower end portion of the shift lever 2. One end portion of the shift cable 4 passing through the shift cable through-hole 11 is coupled to the lower end portion of the shift lever 2 in the internal space of the shift lever housing 1.

A shift cable bracket 8 provided in the shift cable 4 is coupled to the shift cable connector 12, and a select cable bracket 9 provided in the select cable 5 is coupled to the select cable connector 15.

An intermediate partition wall 18 protrudes upward between the shift cable base portion 13 and the select cable base portion 17 to partition them. A plurality of first vertical ribs 19 for connecting the shift cable base portion 13 to the intermediate partition wall 18 are formed to be distanced from each other in the forward and backward directions.

A shift cable base portion side wall 21 facing the intermediate partition wall 18 protrudes upward, and a plurality of second vertical ribs 22 for connecting the shift cable base portion 13 to the shift cable base portion side wall 21 are formed to be distanced from each other in the forward and backward directions.

The shift cable connector 12 connects the intermediate partition wall 18 to the shift cable base portion side wall 21 and protrudes upward, and a plurality of third vertical ribs 23 for connecting the shift cable base portion 13 to the shift cable connector 12 are formed to be distanced from each other in the left and right directions.

A plurality of horizontal partition walls 24 for connecting the intermediate partition wall 18 to the shift cable base portion side wall 21 are formed between the shift cable through-hole 11 and the shift cable connector 12 and protrude upward. A plurality of fourth vertical ribs 25 for connecting the shift cable base portion 13 to the horizontal partition walls 24 are formed to be distanced from each other in the left and right directions.

A select cable base portion side wall 26 facing the intermediate partition wall 18 protrudes upward. The select cable connector 15 connects the intermediate partition wall 18 to the select cable base portion side wall 26 and protrudes upward, and a plurality of fifth vertical ribs 27 for connecting the select cable base portion 17 to the select cable connector 15 are formed to be distanced from each other in the left and right directions.

The base hole 16 is formed with a plurality of cross reinforcement ribs 28 that are disposed in a checkerboard shape. The front and rear end portions of the cross reinforcement ribs 28 are connected to the select cable base portion 17, and the left and right end portions of the cross reinforcement ribs 28 are connected to the intermediate partition wall 18 and the select cable base portion side wall 26.

The shift cable base portion 13 is a part to which a large load is transmitted when shifting gears using the shift lever 2. The shift cable base portion 13 has a sealed structure in which there is no downward open hole for an improvement in strength, and more preferably the shift cable base portion 13 has a strong structure in which the first, second, and fourth vertical ribs 19, 22, and 25 are formed therein.

Since the third vertical ribs 23 are formed in the shift cable connector 12, the strength of the shift cable connector 12 can be enhanced.

The select cable base portion 17 is a part that less affects the strength maintenance of the shift lever housing 1 when shifting gears using the shift lever 2, compared to the shift cable base portion 13.

The base hole 16, which is open downward, is formed in the select cable base portion 17, reducing the overall weight and cost of the shift lever housing 1.

In addition, since the strength of the select cable base portion 17 is decreased due to the formation of the base hole 16, the cross reinforcement ribs 28 are formed in the base hole 16. Thus, the select cable base portion 17 can have a strong structure by effectively reinforcing weak strength.

In addition, the first vertical ribs 19 are formed in the select cable base portion 17, with the consequence that the strength of the select cable base portion 17, which is weakened by the formation of the base hole 16, can be reinforced and the strong structure of the select cable base portion 17 can be maintained by the cross reinforcement ribs 28.

A front right mounting hole 29 is formed between the selector lever installation hole 14 and the base hole 16, a front left mounting hole 31 is formed in one side of the shift cable base portion side wall 21, and a plurality of front left edge holes 32 are formed in a side portion in front of the front left mounting hole 31 while being open downward between the front left mounting hole 31 and the shift cable base portion side wall 21.

The front left edge holes 32 are formed in the portion that does not affect the strength maintenance of the shift lever housing 1 when shifting gears using the shift lever 2, reducing the overall weight and cost of the shift lever housing 1.

An intermediate base portion 33 is positioned in the rear of the shift cable through-hole 11 and protrudes upward. The shift cable through-hole 11 and the selector lever installation hole 14 are formed in the front side and one side of the intermediate base portion 33. A circular hinge mounting port 34, to which the spherical hinge 2a of the shift lever 2 is rotatably mounted, is formed in the upper side of the intermediate base portion 33 and protrudes upward. A plurality of sixth vertical ribs 35 for connecting the intermediate base portion 33 to the hinge mounting port 34 are formed to be distanced from each other in the circumferential direction of the hinge mounting port 34.

The hinge mounting port 34 is a portion to which a large load is transmitted by the shift lever 2 at the time of gear shifting, and is formed with the sixth vertical ribs 35 to have a strong structure.

The intermediate base portion 33 has a rear through-hole 37 and an intermediate through-hole 38 that are respectively formed in the rear side and the other side thereof. A rear right mounting hole 39 and a rear left mounting hole 41 are formed in respective right and left portions behind the rear through-hole 37, and a plurality of intermediate left edge holes 42 are formed in the side portion of the intermediate through-hole 38 while being open downward between the front left mounting hole 31 and the rear left mounting hole 41.

The rear through-hole 37 and the intermediate through-hole 38 are holes for inserting an operator's hand or a tool thereinto when the lower end portion of the shift lever 2 is assembled to one end portion of the shift cable 4 which is inserted into the internal space of the shift lever housing 1 through the shift cable through-hole 11.

The front right and left mounting holes 29 and 31 and the rear right and left mounting holes 39 and 41 are holes into which bolts are inserted to fix the shift lever housing 1 to a vehicle body.

The intermediate left edge holes 42 are formed in the left portion that does not affect the strength maintenance of the shift lever housing 1 when shifting gears using the shift lever 2, reducing the overall weight and cost of the shift lever housing 1.

A plurality of rear edge holes 43 are formed in an edge portion behind the rear through-hole 37 while being open downward between the rear right mounting hole 39 and the rear left mounting hole 41.

The rear edge holes 43 are formed in the rear edge portion that does not affect the strength maintenance of the shift lever housing 1 when shifting gears using the shift lever 2, reducing the overall weight and cost of the shift lever housing 1.

An intermediate portion 45 between the rear right mounting hole 39 and the rear left mounting hole 41 is formed in a rear end portion 44, in which the rear edge holes 43 are formed, to protrude forward toward the rear through-hole 37.

That is, the rear edge holes 43 are formed in the rear edge portion that does not affect the strength maintenance of the shift lever housing 1 when shifting gears using the shift lever 2, as described above. Thus, the intermediate portion 45 of the rear end portion 44, in which the rear edge holes 43 are formed, is formed adjacent to the intermediate base portion 33 toward the rear through-hole 37, with the consequence that a desired strength can be secured, and the external size (rear length) of the shift lever housing 1 can be reduced and thus the weight and cost thereof can be reduced.

Figure 4:
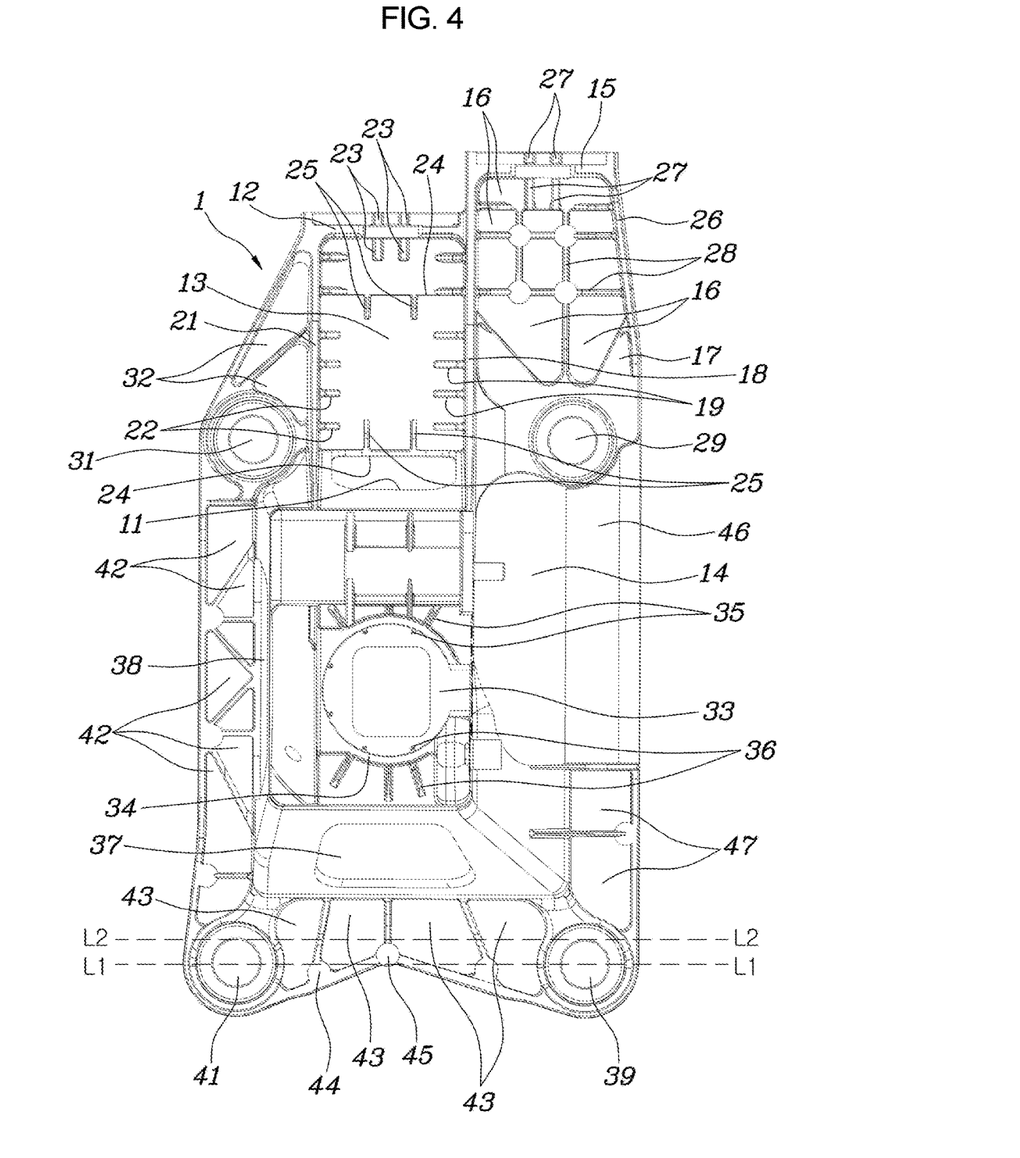
FIG. 4 is a top view of FIG. 3.

The intermediate portion 45 of the rear end portion 44 preferably protrudes forward to a maximum point positioned between a center line L1, which connects the center of the rear right mounting hole 39 and the center of the rear left mounting hole 41, and an external common tangent L2 of the rear right mounting hole 39 and the rear left mounting hole 41, the external common tangent L2 being in front of the center line L1.

When the maximum forward protruding point of the intermediate portion 45 is positioned behind the center line L1, the external size of the shift lever housing and the weight and cost thereof may not be significantly reduced. On the other hand, when the maximum forward protruding point of the intermediate portion 45 is positioned in front of the external common tangent L2, the strength of the shift lever housing may be significantly reduced. Therefore, the maximum forward protruding point of the intermediate portion 45 is preferably positioned between the center line L1 and the external common tangent L2 when considering the external size, weight, cost, and strength of the shift lever housing.

A sealed portion 46 with no downward open hole is formed in the side portion of the selector lever installation hole 14 between the front right mounting hole 29 and the rear right mounting hole 39. A plurality of rear right edge holes 47 are formed in the side portion between the sealed portion 46 and the rear right mounting hole 39 while being open downward.

The sealed portion 46 is a portion in which the selector lever installation hole 14 is formed. When the sealed portion 46 has a downward open hole, the strength thereof is significantly reduced. Thus, the sealed portion 46 in which the selector lever installation hole 14 is formed is formed with no hole, securing a desired strength.

The rear right edge holes 47 are formed in the rear right edge portion that does not affect the strength maintenance of the shift lever housing 1 when shifting gears using the shift lever 2, reducing the overall weight and cost of the shift lever housing 1.

As described above, since no downward open hole is formed in a portion that affects the strength maintenance of the shift lever housing 1 when shifting gears using the shift lever 2 in the exemplary embodiment of the present invention, a desired strength can be sufficiently maintained. On the other hand, since a plurality of downward open holes are formed in portions that do not affect the strength maintenance of the shift lever housing 1 when shifting gears using the shift lever 2, it is possible to reduce the overall weight and cost of the shift lever housing 1 and thus to improve fuel efficiency.

The shift cable base portion 13 equipped with the shift cable 4 is a part to which a large load is transmitted when shifting gears using the shift lever 2. Accordingly, the shift cable base portion 13 has a sealed structure in which there is no downward open hole and a strong structure using the first, second, and fourth vertical ribs 19, 22, and 25 formed therein, facilitating the durability of the shift lever housing 1 to be significantly improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift lever housing for a manual transmission, comprising:
    a shift cable base portion sealed to not have a hole that is open downward to a bottom located between a shift cable through-hole and a shift cable connector; and
    a select cable base portion disposed at a first side of the shift cable base portion and having a base hole that is open downward to a bottom located between a selector lever installation hole and a select cable connector,
    wherein an intermediate partition wall is configured to protrude upward to partition the shift cable base portion and the select cable base portion; and
    wherein a plurality of first vertical ribs configured for connecting the shift cable base portion to the intermediate partition wall are formed to be distanced from each other in forward and backward directions thereof.

2. The shift lever housing according to claim 1, wherein a shift cable base portion side wall facing the intermediate partition wall is configured to protrude upward thereof; and a plurality of second vertical ribs configured for connecting the shift cable base portion to the shift cable base portion side wall are formed to be distanced from each other in the forward and backward directions.

3. The shift lever housing according to claim 2, wherein the shift cable connector is configured to connect the intermediate partition wall to the shift cable base portion side wall and is configured to protrude upward thereof; and a plurality of third vertical ribs configured for connecting the shift cable base portion to the shift cable connector are formed to be distanced from each other in first and second directions thereof.

4. The shift lever housing according to claim 2, wherein a plurality of horizontal partition walls configured for connecting the intermediate partition wall to the shift cable base portion side wall are formed between the shift cable through-hole and the shift cable connector and are configured to protrude upward thereof; and a plurality of fourth vertical ribs configured for connecting the shift cable base portion to the horizontal partition walls are formed to be distanced from each other in first and second directions thereof.

5. The shift lever housing according to claim 1, wherein a select cable base portion side wall facing the intermediate partition wall is configured to protrude upward thereof;

the select cable connector is configured to connect the intermediate partition wall to the select cable base portion side wall and is configured to protrude upward thereof; and a plurality of fifth vertical ribs configured for connecting the select cable base portion to the select cable connector are formed to be distanced from each other in first and second directions thereof.

6. The shift lever housing according to claim 5, wherein the base hole is formed with cross reinforcement ribs disposed in a checkerboard shape; and front and rear end portions of the cross reinforcement ribs are connected to the select cable base portion, and first and second end portions of the cross reinforcement ribs are connected to the intermediate partition wall and the select cable base portion side wall.

7. The shift lever housing according to claim 2, wherein a front right mounting hole is formed between the selector lever installation hole and the base hole;

a front left mounting hole is formed in a first side of the shift cable base portion side wall; and a plurality of front left edge holes are formed in a side portion in a front of the front left mounting hole while being open downward between the front left mounting hole and the shift cable base portion side wall.

8. The shift lever housing according to claim 7, wherein an intermediate base portion is disposed in a rear of the shift cable through-hole and is configured to protrude upward thereof;

the shift cable through-hole and the selector lever installation hole are formed in a front side and a first side of the intermediate base portion;

the intermediate base portion has a circular hinge mounting port that is formed in an upper side thereof and is configured to protrude upward thereof, a spherical hinge of a shift lever being rotatably mounted to the hinge mounting port; and a plurality of sixth vertical ribs configured for connecting the intermediate base portion to the hinge mounting port are formed to be distanced from each other in a circumferential direction of the hinge mounting port.

9. The shift lever housing according to claim 8, wherein the intermediate base portion has a rear through-hole and an intermediate through-hole that are respectively formed in a rear side and a second side thereof;

a rear right mounting hole and a rear left mounting hole are formed in respective right and left portions behind the rear through-hole; and a plurality of intermediate left edge holes are formed in a side portion of the intermediate through-hole while being open downward between the front left mounting hole and the rear left mounting hole.

10. The shift lever housing according to claim 9, wherein a plurality of rear edge holes are formed in an edge portion behind the rear through-hole while being open downward between the rear right mounting hole and the rear left mounting hole.

11. The shift lever housing according to claim 9, wherein an intermediate portion between the rear right mounting hole and the rear left mounting hole is formed in a rear end portion, in which rear edge holes are formed, to protrude forward toward the rear through-hole.

12. The shift lever housing according to claim 11, wherein the intermediate portion of the rear end portion is configured to protrude forward to a maximum point between a center line, which connects a center of the rear right mounting hole and a center of the rear left mounting hole, and an external common tangent of the rear right mounting hole and the rear left mounting hole, the external common tangent being disposed in a front of the center line.

13. The shift lever housing according to claim 9, wherein a sealed portion with no downward open hole is formed in a side portion of the selector lever installation hole between the front right mounting hole and the rear right mounting hole; and a plurality of rear right edge holes are formed in a side portion between the sealed portion and the rear right mounting hole while being open downward therefrom.

* * * * *